United States Patent [19]
Grace et al.

[11] Patent Number: 5,813,237
[45] Date of Patent: Sep. 29, 1998

[54] CRYOGENIC APPARATUS AND METHOD FOR SPRAYING A CRYOGEN INCORPORATING GENERATION OF TWO PHASE FLOW

[75] Inventors: Mark Thomas Grace, Bridgewater, N.J.; Michael Bruce Pooley, London, England; David G. Wardle, Bridgewater; Ron C. Lee, Bloomsbury, both of N.J.

[73] Assignee: The BOC Group, Inc., New Providence, N.J.

[21] Appl. No.: 884,423

[22] Filed: Jun. 27, 1997

[51] Int. Cl.⁶ .................................. F17C 7/02; F25D 17/02
[52] U.S. Cl. ..................... 62/52.1; 62/64; 62/374; 62/380
[58] Field of Search ................. 62/52.1, 374, 380, 62/64

[56] References Cited

U.S. PATENT DOCUMENTS

| | | | |
|---|---|---|---|
| 3,421,336 | 1/1969 | Lichtenberger et al. | 62/52.1 |
| 3,788,825 | 1/1974 | Arenson | 62/52.1 |
| 4,171,625 | 10/1979 | Morgan et al. | 62/52.1 X |
| 4,813,245 | 3/1989 | Hubert et al. | 62/380 |
| 4,934,151 | 6/1990 | Shima | 62/52.1 X |
| 4,966,003 | 10/1990 | Shima | 62/380 X |
| 5,040,374 | 8/1991 | Micheau | 62/52.1 |
| 5,054,292 | 10/1991 | Klee | 62/380 X |
| 5,186,008 | 2/1993 | Appolonia et al. | 62/374 X |
| 5,417,074 | 5/1995 | McAfee et al. | 62/374 X |
| 5,454,232 | 10/1995 | Lermuzeaux | 62/374 |
| 5,460,015 | 10/1995 | Venetucci | 62/374 |
| 5,467,612 | 11/1995 | Venetucci | 62/374 |
| 5,630,321 | 5/1997 | Miller | 62/64 X |
| 5,740,678 | 4/1998 | Lee et al. | 2/374 X |

*Primary Examiner*—Christopher B. Kilner
*Attorney, Agent, or Firm*—David M. Rosenblum; Salvatore P. Pace

[57] ABSTRACT

An apparatus and method for spraying a cryogen in which a heat load is sprayed with a cryogen from one or more spray nozzles within a spray zone. A heat conductive element is positioned below the article and is provided with a surface sized to catch the liquid content of the cryogen that has been oversprayed, thereby to vaporize the overspray through direct heat transfer with the conductive element. In another aspect the present invention provides an apparatus and method in which a flow network a flow of a liquid cryogen is divided into first and second subsidiary streams. The second subsidiary stream is vaporized within a branch of the network and then mixed back into the first subsidiary stream to produce a two phase flow of the cryogen. The cryogen is then sprayed as the two phase flow. The flow rate of the second subsidiary stream can be controlled with a proportional valve to adjust the quality of the cryogen being sprayed so that pooling of overspray on said heat conductive element is inhibited.

23 Claims, 1 Drawing Sheet

CRYOGENIC APPARATUS AND METHOD FOR SPRAYING A CRYOGEN INCORPORATING GENERATION OF TWO PHASE FLOW

BACKGROUND OF THE INVENTION

The present invention relates to an apparatus and method for spraying an article with a cryogen from one or more spray nozzles. More particularly, the present invention relates to such an apparatus and method in which a heat conductive element, positioned beneath the article, contacts liquid overspray to vaporize such overspray through direct heat transfer with the conductive element. In other aspects the present invention relates to such an apparatus and method in which a liquid flow of the cryogen is converted into a two phase flow prior to being sprayed. More particularly, in such aspects, the present invention relates to such apparatus and method in which the two phase flow conversion is effected by vaporizing a subsidiary flow of the liquid flow and combining the resultant vapor with another subsidiary flow of liquid to produce the two phase flow.

There are many industrial applications that require a cryogen having a liquid content to be sprayed against an article. For instance, in the food processing industry, a cryogenic refrigerant, for example, liquid nitrogen or liquid air, is sprayed against an article for refrigeration purposes. In a specific food processing application, articles are sprayed with a cryogenic refrigerant in order to produce a crust freezing effect that acts as a protective layer to prevent dehydration. Such crust freezing may take place in a tunnel freezer or at the vestibule portion of a spiral freezer. The spiral freezer may be of the type in which freezing the article is completed by a mechanical refrigeration cycle or alternatively, by cryogenic refrigeration means. In non-food arts, concrete slabs are cured by spraying the slabs with a cryogen. Articles to be cleansed of paint or grease are also sprayed with a cryogen in order to break up surface matter to be removed.

The problem common to all of types of cryogenic applications in which a cryogen having a liquid content is sprayed, is that the overspray, that is, the cryogen that does not actually vaporize upon contact with the article, will tend to pool beneath the article. With any cryogen, this can present a problem in that underlying structure (for instance the bottom of a food freezer) can be damaged and in case of a substance such as nitrogen, the liquid can seep out of a closed structure and present a suffocation hazard. In case of cryogenic refrigerants such as liquid air or synthetic mixtures of oxygen and nitrogen which are meant to be breathable, yet safe, the lower volatility of the nitrogen will cause the liquid to continually enrich in oxygen. The oxygen enrichment coupled with a hydrocarbon containing product to be sprayed, such as food, can make whole proposition dangerous.

The problem of pooling has been addressed in prior art refrigeration devices in which it is desired to produce freezing with a cold gaseous refrigerant. For instance, in U.S. Pat. No. 2,479,821 a liquid cryogen is sprayed onto an arrangement of plates located within the top of a railroad car. The plates ensure that all liquid vaporizes so that the rail cargo is not directly sprayed with the liquid. Also, U.S. Pat. No. 4,726,195 provides a cryogenic refrigeration system in which a liquid cryogen is sprayed through a venturi-like device so that the liquid provides a motive force to produce circulation within the container. In the course of effecting such object, warm vapor is drawn into the liquid flow to in turn vaporize the liquid. The temperature at the outlet of the venturi-like device is sensed so that when the temperature drops to a pre-set temperature (at or above the temperature of a liquid phase of the cryogenic refrigerant) a control system activates a control valve to cut off the flow of the cryogenic refrigerant. After the container sufficiently warms, the control valve is opened to allow resumption of the flow of the cryogen.

Neither of these foregoing patents, or the prior art for that matter, contemplate the prevention of pooling when the liquid cryogen is to be directly applied as a spray and an overspray is produced from the liquid that is not vaporized by the heat load. For instance, in the '821 patent, the cryogen is vaporized prior to being sprayed and then used as a vapor. In the '195 patent, as the content of the cryogen tends toward a liquid, the supply of cryogen is cut off to prevent utilization of the cryogen as a liquid and thereby also to prevent pooling.

It has been found by the inventors herein that it is desirable from a heat transfer standpoint to spray the cryogen as a two phase flow and to control the quality (that is the vapor content) of such flow in order to in turn control the process from a refrigeration standpoint. Control of the quality can also be used to prevent pooling. As will be discussed, the present invention also provides an apparatus and method in which any overspray that is nevertheless produced, vaporizes in a controlled manner in order to prevent pooling.

SUMMARY OF THE INVENTION

An apparatus is provided for spraying a cryogen having a liquid content. The apparatus includes at least one spray nozzle positioned to spray a heat load located within a spray zone. A heat conductive element is positioned below the spray zone and has a surface sized to catch overspray formed from the liquid content of the cryogen, thereby to vaporize the overspray through direct heat transfer with the heat conductive element. In another aspect, the present invention provided a method of spraying a cryogen having a liquid content. In accordance with the method, a heat load is sprayed with the cryogen within a spray zone. Overspray formed from the liquid content of the cryogen is vaporized through direct heat transfer with a heat conductive element positioned beneath the spray zone and having a surface sized to catch the overspray. The vaporization of the overspray prevents pooling.

As has been discussed above, the cryogen is preferably sprayed as a two phase flow rather than as a liquid flow. Thus, in accordance with still another aspect of the present invention, an apparatus is provided for spraying the liquid cryogen as a two phase flow. In accordance with such aspect, a flow system is provided having first and second legs to divide the liquid cryogen into first and second subsidiary streams. A vaporizer is located within the second leg to vaporize the second subsidiary stream. A mixing device is connected to the first and second legs to mix the second subsidiary stream, after having been vaporized, with the first subsidiary stream, thereby to form the two phase flow. At least one spray nozzle is connected to the mixing device to spray the two phase flow. In accordance with yet still another aspect, the present invention provides a method of spraying a liquid cryogen in which the liquid cryogen is divided into first and second subsidiary streams. The second subsidiary stream is vaporized and the first and second subsidiary streams are mixed, after vaporization of the second subsidiary stream, to form the two phase flow. The resultant two phase flow is then sprayed. As will be discussed, these forgoing aspects of the present invention can be used in connection with those aspects of the present invention incorporating the heat conductive element to prevent pooling and also, to regulate the refrigeration supplied by the cryogen.

BRIEF DESCRIPTION OF THE DRAWINGS

While the specification concludes with claims distinctly pointing out the subject matter that Applicants regard as their invention, it is believed the invention will be better understood when taken in connection with the accompanying drawings in which:

DETAILED DESCRIPTION

Figure 1:
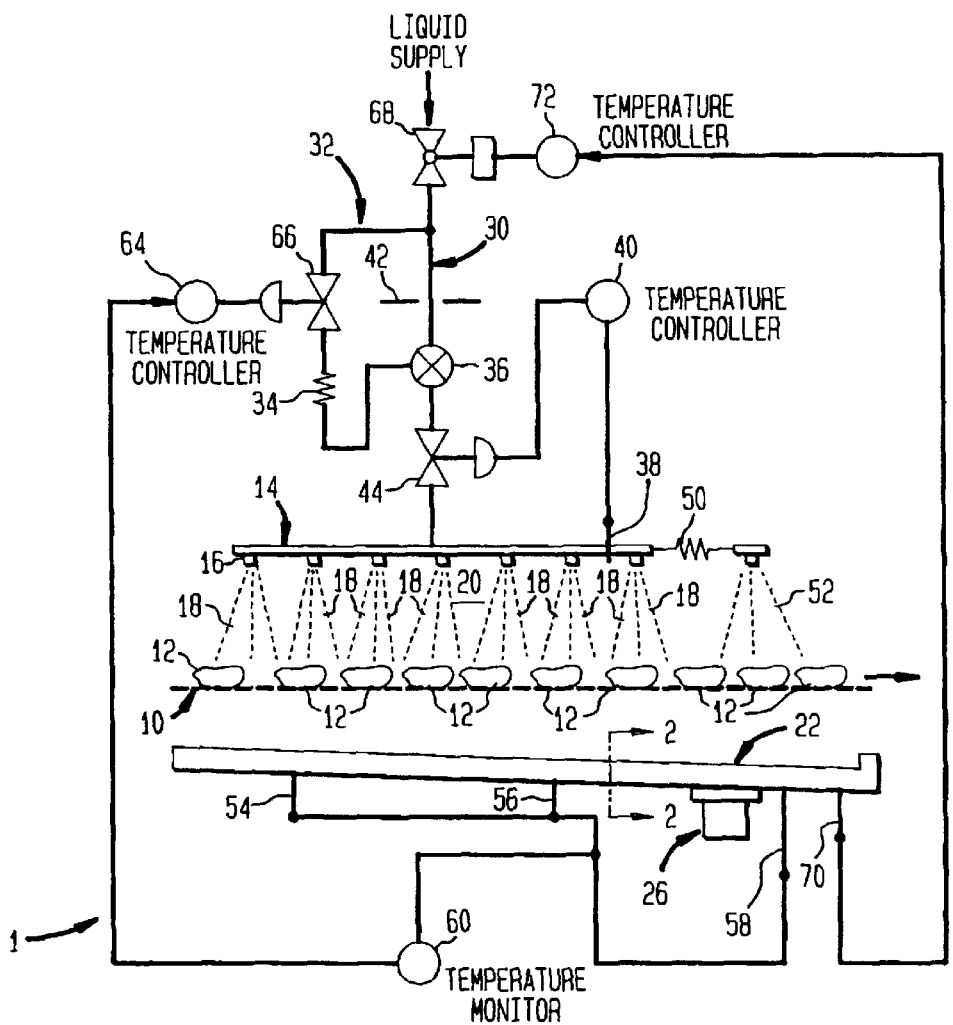
FIG. 1 is a schematic view of an apparatus for carrying out a method in accordance with the present invention.

With reference to FIG. 1, an apparatus 1 in accordance with the present invention is illustrated in a refrigeration application. Such apparatus could be housed within a tunnel freezer or as illustrated, might be utilized without a housing in a cold storage room. In applications that are open or where it is desired to allow egress by operational personnel, the cryogenic refrigerant can be liquid air or a synthetic mixture of oxygen and nitrogen. In completely closed environments, other liquid cryogenic refrigerants can be used, such as liquid nitrogen. In this regard, the term, "cryogen" as used herein and in the claims means any substance that normally exists as a vapor at standard atmospheric temperature and pressure.

Apparatus 1 includes a conveyor 10 which is an endless belt used in conveying articles 12 to be refrigerated. As such, articles 12 are the heat load that interact with the cryogen to be sprayed. In order to effect the spraying, a manifold 14 is provided having spray nozzles 16 to spray the cryogen as spray 18 against articles 12 within a spray zone 20. It is to be pointed out here that the term "spray nozzle or nozzles" as used herein and in the claims encompasses any device from which a spray could emanate. As such, a spray nozzle used in the present invention could be a hole in a pipe. Spray zone 20 is defined by the spatial region taken up by sprays 18. As can be appreciated from the illustration, not all of the liquid content of the cryogen will be vaporized on contact with articles 12. Thus, conveyor 10 is an open structure (for instance a belt having openings such as holes or slots) to allow spray 18 to pass from nozzle 16 through spray zone 20 onto the articles and through conveyor 10. As can be appreciated, conveyor 10 is shown for exemplary purposes only and other conveyances such as hooks, rollers and etc. are possible. The liquid content of the cryogen not vaporized within spray zone 20, either before or after contact with articles 12 or for that matter, conveyor 10, constitutes an overspray that is caught by a heat conductive element 22.

Figure 2:
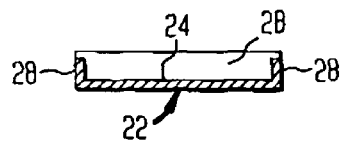
FIG. 2 is a fragmentary sectional view of FIG. 1 taken along line 2—2 of FIG. 1.

With additional reference to FIG. 2, heat conductive element 22 is positioned below spray zone 20 and is provided with a surface 24 sized to contact the oversprayed liquid cryogenic refrigerant. Thus, heat conductive element 22 should be fabricated from aluminum, copper or other heat conductive material. As will be discussed, heat conductive element 22 conducts heat from the surroundings. For instance, in many freezers that use liquid cryogen as a refrigerant, the interior of the freezer is approximately 50° C. warmer than the liquid cryogen. Thus, the heat to be conducted by conductive element 22 originates in the environment that apparatus 1 operates.

As can be seen in the illustration preferably, heat conductive element 22 downwardly slopes to a warmer end of the process so that any liquid cryogen that does not immediately vaporize upon contact with conductive element 22 will tend to flow down the slope of surface 24 of heat conductive element 22 to eventually be vaporized. In order to produce motion in unvaporized liquid droplets and also, to prevent droplets from agglomerating into larger puddles, a known vibrator 26 can be provided to produce a standing vibration within surface 24 of conductive element 22. In order to confine liquid to surface 24 of heat conductive element 22, peripheral lip sections 28 can preferably be provided to confine liquid to surface 24. Thus heat conductive element 22 can be said to have a tray-like configuration.

As can be appreciated, in order to catch the overspray, surface 24 of heat conductive element should be sized to catch the overspray. In this regard such sizing in practice requires both the width and length of surface 24 of heat conductive element 22 to be sized larger than spray zone 20.

As has been discussed above, it has been found by the inventors herein that cryogenic liquid refrigerant should be sprayed as a two phase flow in order to produce the most efficient heat transfer. A liquid-vapor ratio of about 60-40 is preferred. In order to produce the two-phase flow, the cryogenic liquid refrigerant is routed through a flow network having first and second legs 30 and 32 to divide the flow of the liquid cryogenic refrigerant into a first subsidiary stream within first leg 30 and a second subsidiary stream within second leg 32. The liquid cryogenic refrigerant is vaporized within second leg 32 by provision of a vaporizer 34 which can be fabricated from a coil of tubing of sufficient dimension to cause the required vaporization. In an application of the present invention to a refrigeration device, vaporizer 34 would be positioned within the confines of such a device to avoid heat gain through such vaporizer 34 and hence, reduced thermal efficiency. The now vaporized second subsidiary stream is combined with the first stream by a mixing device 36 which could be simply a piping Tee. Such piping Tee could be provided with an orifice or preferably a spray nozzle to produce a jet of liquid to draw the vaporized second subsidiary stream into a turbulent mixture with the liquid of the first subsidiary stream and thereby produce a two phase flow to be introduced into manifold 14. Another option is to use an atomizing nozzle in which the second subsidiary stream acts as the atomizing fluid to atomize the liquid.

Although apparatus 1 could be designed for steady state operation, preferably flexibility is built into its operation by a control system. The spray zone temperature of spray zone 20 is measured by a temperature sensor 38. A spray zone temperature signal representing the sensed temperature is introduced as an input into a temperature controller 40 which is preferably a programmable PID type of controller. An orifice plate 42 sets the maximum liquid flow rate within first leg 30. Orifice plate 42 together with the position of a proportional valve 66 (to be discussed hereinafter) produces a mostly constant ratio of flow passing through first and second legs 30 and 32 and thus, a designed normal operating ratio of liquid to vapor within the cryogen sprayed into spray zone 20 depending on the degree to which proportion valve 66 is open. Given that mixing Tee 36 can itself incorporate an orifice or spray nozzle, a separate orifice plate could be dispensed with in a proper embodiment. The designed normal operating ratio can be 60-40 as discussed above. Moreover, as will be discussed, the use of an orifice plate acts to set the maxim flow which is a necessary design criteria for heat conductive element 22. As can be appreciated, the piping and valves contained within first and second legs 30 and 32 will contribute to the actual flow split.

Temperature controller 40 has provision for setting a preset, desired temperature within spray zone 20. Temperature controller 40 in turn controls a proportional valve 44 to meter the flow of cryogen being introduced into spray zone 20. As temperature increases within spray zone 20, as measured by temperature sensor 38, temperature controller 40 commands proportional valve 44 to open to increase the flow rate of cryogen entering spray zone 20 and vice-versa. In such manner the temperature of spray zone 20 is maintained at a substantially constant preselected spray zone temperature.

In the event that the temperature within spray zone 20 becomes too cold, not enough liquid will vaporize on articles 12. This can occur if there were a substantial decrease in the heat load. As a result, liquid may be retained on articles 12 and thus, not vaporized on heat conductive element 22. In order to prevent this, preferably, another heat exchanger 50 is connected to manifold 14 to produce a spray of vapor 52 which will act to blow liquid off of articles 12.

In order to inhibit liquid from pooling on heat conductive element 22, the quality of sprays 18 is adjusted to maintain the temperature of the conductive element above the temperature of spray zone 20. To this end, a heat conductive element temperature is sensed as an average temperature of heat conductive element 22. This is accomplished by separate temperature measurements effected by three temperature sensors 54, 56 and 58 positioned at the ends and center of heat conductive element 22. With less effect, a single, centrally located temperature sensor can be used. These temperatures are averaged in a multi-channel temperature monitor 60 which produces an output signal referable to such average temperature and thus, the heat conductive element temperature. The output signal is fed as an input to a temperature controller 64, another programmable PID controller.

Temperature controller 64 preferably has provision for registering a preset, reference percentage opening that is used to control the amount a proportional valve 66 is open. Thus, proportional valve 66 can represent an adjustable flow coefficient to control the desired liquid-vapor ratio (e.g. 60-40) of the cryogenic refrigerant to be sprayed. Temperature controller 64 also has provision for registering a preset reference temperature which is preferably about 10° C. above the temperature to be maintained within spray zone 20. Temperature controller 64 is preferably programmed in the following manner: In the event that the temperature as developed by temperature monitor 60 is warmer than the preset reference temperature, proportional valve 66 will remain at its preset, reference percentage of opening. If, the temperature as developed by temperature monitor 60 is colder than the preset reference temperature, proportional valve 66 will be commanded by temperature controller 64 to open and thereby increase the amount of vapor within the cryogenic refrigerant to be sprayed. When the temperature developed by monitor 60 is again warmer than the preset reference temperature, proportional valve 66 returns to its preset percentage of opening as registered within temperature controller 64.

Even with the use of the control system of the present invention, transients can occur in which cryogenic liquid refrigerant forms a pool on conductive element 22. In such case, a control valve 68 closes. Preferably the temperature at the lowest point of conductive element 22 is sensed by a temperature sensor 70 that produces an output signal referable to such sensed temperature which is fed as an input to temperature controller 72, preferably an on/off or thermostat controller. Temperature controller 72 is preset with a temperature that is selected to be above the boiling point temperature of the cryogen by a margin of typically about 80° C. When the sensed temperature is above the present temperature, controller 72 functions as an interlock to activate closure of valve 68.

Figure 3:
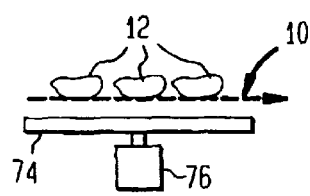
FIG. 3 is a fragmentary view of an alternative embodiment of a heat conductive element.

In any embodiment of the present invention, the conductive heat transfer coefficient of heat conductive element 24 can be modified by imparting motion thereto. For instance, an oscillatory motion could be imparted to heat conductive element 24. Alternatively, as shown in FIG. 3, an embodiment of the present invention is illustrated in which a disc-like heat conductive element 74 having an upturned brim is provided. Heat conductive element 74 is rotated by a motor 76. In such illustration although no control system is illustrated, the same could be provided.

Figure 4:
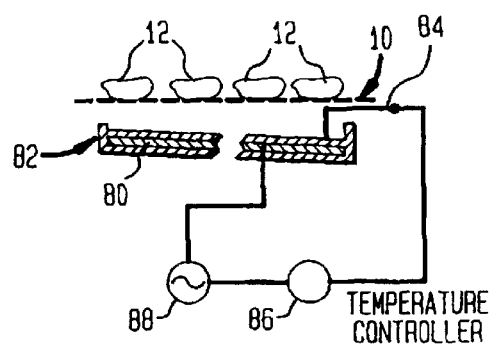
FIG. 4 is a fragmentary view of an additional alternative embodiment of a conductive element to be used in connection with the apparatus shown in FIG. 1.

With reference to FIG. 4, another possible embodiment would be provided by embedded heating coils 80 within a heat conductive element 82. A temperature sensor 84 is provided in such embodiment to sense the temperature of conductive element 82 and to supply such signal as an input to a controller 86, a programmable PID controller. Controller 86 regulates a power supply 88 to in turn regulate the power input to heating elements 80, thereby to control surface temperature of conductive element 82 to be above the boiling point temperature of the liquid cryogen. This foregoing embodiment could also be used with apparatus 1 by its simple addition thereto. In such case heat conductive element 82 having embedded heating coils would be used in place of heat conductive element 22. On this point, the output of temperature sensor 70 would be used to control both the heating elements 80 and valve 68. Thus, at a preset temperature not only would valve 68 close but power would be applied to heating elements 80.

It is to be noted that controllers 40, 64, and 86 are readily available PID (Proportional, Integral, Differential) controllers with no specific manufacturer being preferred. The proportional, integral, and differential constants for each controller is in practice determined experimentally, in a manner known in the art. As can be appreciated, analogue controllers are also possible, but less preferred.

Although the various embodiments of heat conductive elements 24, 74 and 82 are illustrated as providing flat surfaces to contact the overspray, irregular surfaces could be provided to increase heat transfer. However, such irregular surfaces such as provided by a mesh or by ridges and etc. might tend to trap particles of the articles to be frozen. This could present a danger in case of a food freezing application of apparatus 1. Furthermore, the present invention encompasses embodiments with simply heat conductive elements alone without control systems, sprays of pure liquid rather than two phase flows, or partial controls such as control valve 68 to cut off the flow of liquid when surface temperature of the heat conductive element approaches the boiling point temperature of the cryogen.

Any heat conductive element designed in accordance with the present invention must be massive enough to retain enough sensible heat energy to fully vaporize any transient overspray of liquid when the temperature a sensed by temperature sensor 70 falls below the preset temperature of controller 72. In order to calculate the required mass of the conductive element it is necessary to first make an assessment of the amount of liquid which could potentially spill onto the conductive element before any control system closes the control valve 68. This of course would be a function of: the response time of sensor 70, the speed with which control valve 68 closes, and the amount of any remaining liquid remaining as a simple equation as follows:

$$Me = Ms + [(\{Tr+Tv\} \times Fc) + M_1] \times Vc/Ce/\Delta Temp.$$

Where:
Me is the mass of the conductive element
$M_1$ is the mass of the liquid in the line downstream from control valve 68
Ms is the safety margin allowed for the element
Tr is the response time of the temperature sensor
Tv is the response time of control valve 68
Fc is the mass flow rate of the cryogen
Vc is the energy of vaporization of the cryogen per unit mass
Ce is the specific heat capacity of the element material
$\Delta$Temp=Preset Reference Temperature−Boiling Point Temperature of the Cryogen.

As has been mentioned, the maximum flow rate of the liquid content of the cryogen is set by an orifice plate 42 or the orifice or spray nozzle within mixing Tee 36. and such maximum flow rate that is used as a value for $M_1$.

While the present has been described with reference to a preferred embodiment, as will occur to those skilled in the art, numerous changes, additions and omissions may be made without departing from the spirit and scope of the present invention.

We claim:

1. An apparatus for spraying a cryogen having a liquid content, said apparatus comprising:

at least one spray nozzle positioned to spray a heat load located within a spray zone; and a heat conductive element positioned beneath the spray zone and having a surface sized to catch overspray formed from the liquid content of the cryogen, thereby to vaporize said overspray through direct heat transfer with said heat conductive element.

2. The apparatus of claim 1, further comprising a vaporizer in communication with said at least one spray nozzle for at least partly vaporizing said cryogenic refrigerant.

3. The apparatus of claim 2, further comprising:

a flow network having first and second legs to divide a flow of said cryogenic refrigerant into a major stream and a subsidiary stream;

said vaporizer is located in said second leg to vaporize said subsidiary stream;

a mixing device connected to said first and second legs to combine said subsidiary stream with said major stream, thereby to produce a two-phase flow of said cryogenic refrigerant; and said at least one spray nozzle in communication with said mixing device.

4. The apparatus of claim 3, further comprising:

a proportional valve interposed between said mixing device and said at least one nozzle;

a temperature sensor to sense spray zone temperature; and a spray zone temperature controller responsive to said temperature sensor to control the proportional valve and thus, the flow of said cryogenic refrigerant entering said spray zone so that said spray zone remains at substantially a constant preset, spray zone temperature.

5. The apparatus of claim 4, further comprising:

a boundary temperature sensor to sense boundary temperature of said conductive element and generate a second temperature signal referable to said boundary layer temperature;

a control valve connected to both of said first and second legs; and an interlock controller response to said third temperature signal and configured to close said control valve at a temperature greater than boiling point temperature of said cryogen.

6. The apparatus of claim 4, further comprising:

said temperature sensor and said proportional valve comprises a first temperature sensor and a first proportional valve;

said second leg having a second proportional valve to control vapor content of said cryogenic refrigerant sprayed within said spray zone; and a control system to inhibit pooling of said overspray on said heat conductive element, said control system including:

at least one second temperature sensor to sense heat conductive temperature of said heat conductive element;

a second temperature controller to control the position of said second proportional valve, said second controller having means for registering a preset percentage of opening of said second proportional valve and a preset reference temperature for said heat conductive element, and configured such that if said heat conductive temperature of said heat conductive element is warmer than said preset reference temperature, said second temperature controller positions said second proportional valve at said preset percentage of opening and if said heat conductive temperature of said heat conductive element is colder than said preset reference temperature, said second temperature controller re-positions said second proportional valve so that it opens to a greater percentage of opening than said preset percentage of opening until said heat conductive temperature is again above said preset reference temperature.

7. The apparatus of claim 1, wherein said surface of said conductive element downwardly slopes.

8. The apparatus of claim 1, wherein said conductive member has a tray-like configuration with peripheral lip sections to retain said overspray.

9. The apparatus of claim 1, wherein said conductive member is fabricated from sheet material and further includes a vibrator to prevent any oversprayed liquid from agglomerating.

10. The apparatus of claim 1 further comprising a heater embedded in said conductive element.

11. The apparatus of claim 1, wherein said conductive element comprises a spinning disk.

12. The apparatus of claim 1, further comprising:

another vaporizer to vaporize a portion of said cryogen; and a nozzle connected to said another vaporizer to form a vapor stream directed at said heat load to blow off spray retained on said heat load.

13. An apparatus for spraying a liquid cryogen as a two phase flow, said apparatus comprising:

a flow system having first and second legs to divide said liquid cryogen into first and second subsidiary streams;

a vaporizer located within said second leg to vaporize said second subsidiary stream;

a mixing device connected to said first and second legs to mix said second subsidiary stream, after having been vaporized, with said first subsidiary stream, thereby to form said two phase flow; and at least one spray nozzle in communication with said mixing device to spray said two phase flow.

14. The apparatus of claim 13, wherein a control valve is located within said second leg to adjust quality of said two phase flow.

15. A method of spraying a cryogen having a liquid content, said method comprising:

spraying a heat load with said cryogen within a spray zone; and vaporizing overspray formed from the liquid content of the cryogen through direct heat transfer with a heat conductive element positioned beneath said spray zone and having a surface sized to catch the overspray.

16. The method of claim 15, further comprising partially vaporizing said cryogenic refrigerant prior to being sprayed.

17. The method of claim 16, further comprising:

dividing a flow of said cryogenic refrigerant into first and second subsidiary streams;

vaporizing said second subsidiary stream;

mixing said first and second subsidiary streams, after vaporization of the second subsidiary stream, thereby to produce a two-phase flow of said cryogenic refrigerant; and spraying said two-phase flow.

18. The method of claim 17, further comprising further comprising controlling the flow rate the cryogenic refrigerant to control spray zone temperature.

19. The method of claim 18, further comprising:

sensing boundary temperature of the heat conductive element; and cutting off the major and subsidiary streams so that the boundary temperature does not fall below boiling point temperature of the cryogen.

20. The method of claim 18, further comprising:

sensing heat conductive temperature of said heat conductive element;

controlling the vapor content of the two-phase flow by comparing said heat conductive temperature with a reference temperature for said heat conductive element, if said heat conductive temperature is warmer than said reference temperature, maintaining said vapor content substantially constant, and if said heat conductive temperature is colder than said reference temperature, increasing said vapor content until said heat conductive temperature is again above said preset reference temperature.

21. The method of claim 15, further comprising:

vaporizing a portion of the cryogen prior to its being sprayed to produce a vapor stream; and directing the vapor stream against the heat load to blow spray off the heat load.

22. A method of spraying a liquid cryogen, said method comprising:

dividing said liquid cryogen into first and second subsidiary streams;

vaporizing the second subsidiary stream;

mixing the first and second subsidiary streams, after vaporization of the second subsidiary stream, thereby to produce a two phase flow; and spraying said two phase flow.

23. The method of claim 22, further comprising controlling flow rate of the second subsidiary stream to in turn adjust quality of the two phase flow.

* * * * *